(12) United States Patent
Lau

(10) Patent No.: US 6,554,132 B2
(45) Date of Patent: Apr. 29, 2003

(54) DISK PROTECTIVE ENCLOSURE

(75) Inventor: Kwok Din Lau, Chai Wan (HK)

(73) Assignee: Finest Industrial Co., Ltd., Chaiwan (HK)

( * ) Notice: Subject to any disclaimer, the term of this patent is extended or adjusted under 35 U.S.C. 154(b) by 0 days.

(21) Appl. No.: 09/789,284

(22) Filed: Feb. 20, 2001

(65) Prior Publication Data

US 2002/0112974 A1 Aug. 22, 2002

(51) Int. Cl.⁷ .............................................. B65D 85/57
(52) U.S. Cl. .................... 206/303; 206/307; 206/308.1; 206/445; 206/472
(58) Field of Search ................... 206/303, 307, 206/308.1, 308.3, 311, 450, 472, 310, 445; 369/291

(56) References Cited

U.S. PATENT DOCUMENTS

| | | | | |
|---|---|---|---|---|
| 4,518,275 A | * | 5/1985 | Rauch, III et al. | 206/308.3 |
| 4,588,321 A | * | 5/1986 | Egly | 206/308.3 |
| 5,209,593 A | * | 5/1993 | Ros | 206/472 |
| 5,477,960 A | * | 12/1995 | Chen | 206/308.1 |
| 5,513,749 A | * | 5/1996 | Simmons | 206/308.1 |
| 5,558,220 A |   | 9/1996 | Gartz | |
| 5,597,068 A | * | 1/1997 | Weisburn et al. | 206/308.1 |
| 5,697,498 A | * | 12/1997 | Weisburn et al. | 206/308.1 |
| 5,727,681 A | * | 3/1998 | Li | 206/308.1 |
| 5,845,771 A | * | 12/1998 | Fu | 206/308.1 |
| 5,944,181 A |   | 8/1999 | Lau | |
| 5,988,375 A |   | 11/1999 | Chang | |
| 5,996,788 A |   | 12/1999 | Belden, Jr. et al. | |

* cited by examiner

*Primary Examiner*—Jim Foster
(74) *Attorney, Agent, or Firm*—Sheldon & Mak

(57) ABSTRACT

A container for disks having a central opening includes a case having hingedly connected lid, spine, and base portions, a pedestal projecting forwardly from a panel portion of the base for holding one of the disks, and a hinge structure projecting forwardly from the base for pivotally supporting one or more trays holding additional disks. The hinge structure includes a spaced pair of posts, each post having a spaced pair of leaf members and a reinforcing bridge connecting inwardly facing tips of the leaf members, for snap engagement with pairs of inwardly facing stub journals that are formed on the trays. The case has a closed position with the lid and base portions snaped together, each having a compact recessed overhanging lip formation opposite the spine portion for facilitating opening of the case.

15 Claims, 5 Drawing Sheets

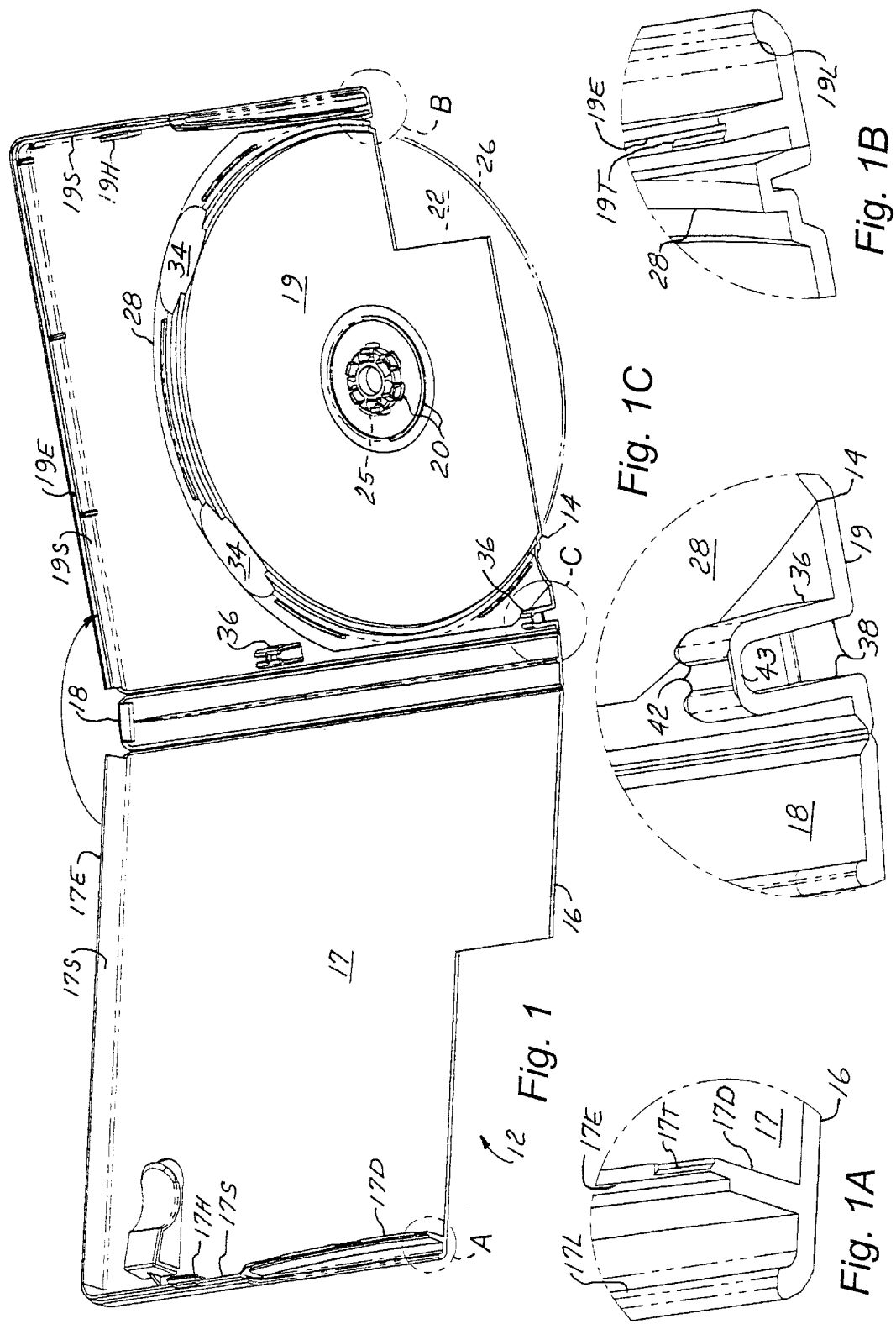

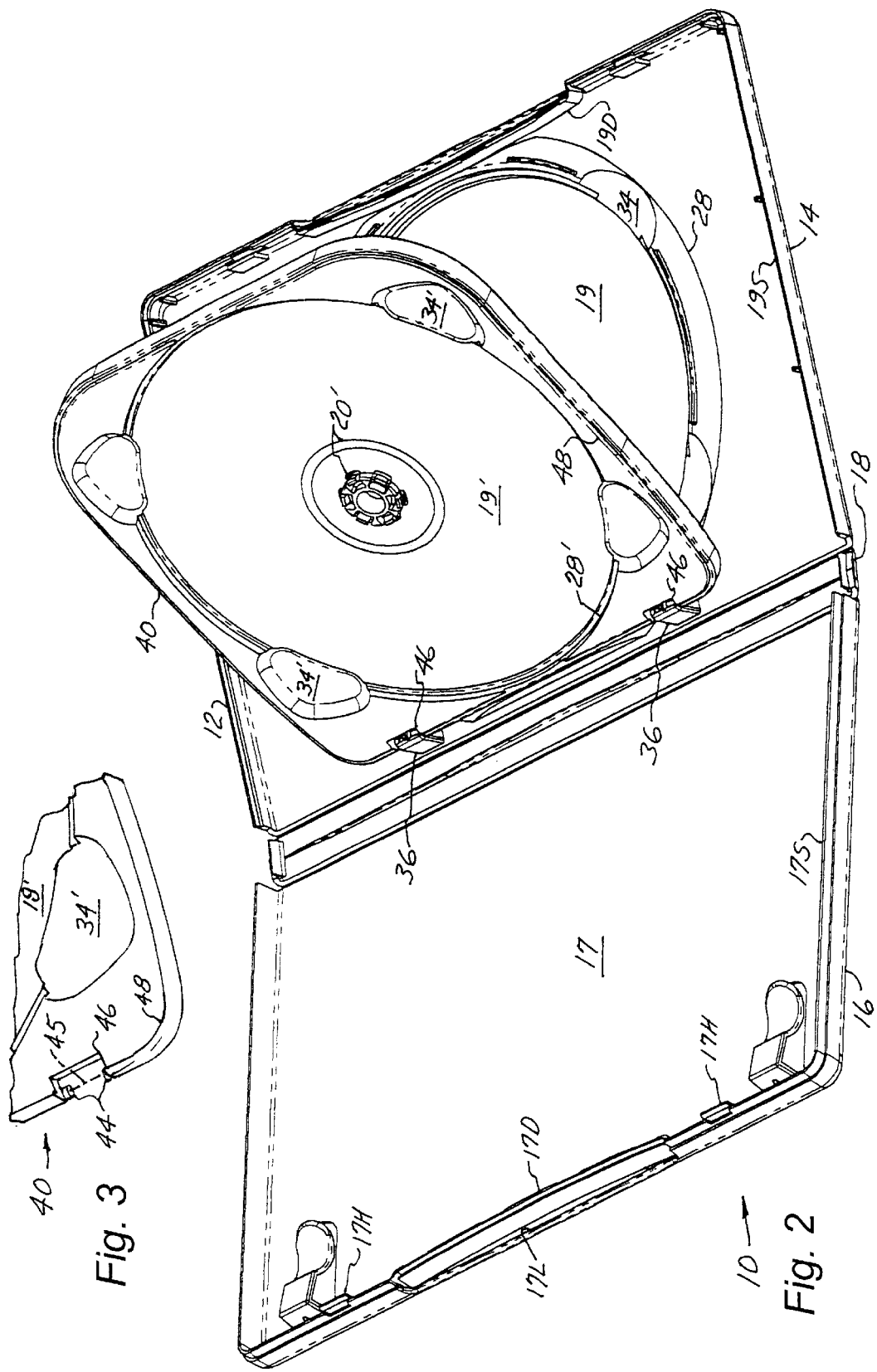

DISK PROTECTIVE ENCLOSURE

BACKGROUND

The present invention relates to optical data disks such as compact disks (CDs) and video disks (DVDs) that have central circular locating openings, and more particularly to devices for protectively enclosing such disks for storage of same.

Data disks such as compact disks and video disks typically have large amounts of digitally stored information that is optically readable through a transparent bottom layer of the disk by a movable head during rotation of the disk. The information is arranged in one or more tracks that are covered by a thin.protective top layer of the disk that can have labeling applied thereto such as by silkscreening. Normal handling of the disk can result in scratching of the bottom layer, resulting in loss of data by interference with the optical path such as by loss of focus and/or lateral image displacement. Also, data can be lost by scratching of the protective layer which is typically very thin, on the order of 20 microns, resulting in removal of information from a vapor deposited metal layer that is only about 0.1 micron thick. Protective containers for the disks in common use have a central pedestal for supportively gripping the disc by engaging the central opening without contacting either side of the disk within data-containing regions thereof. Such containers may have a ledge for contacting portions of an outer perimeter of the disk for stabilizing the disk against tipping on the pedestal. The disk is loaded into the container by lowering it onto the pedestal while gripping opposite perimeter portions, engagement with the pedestal being typically effected by simultaneous finger pressure against the disk proximate the central opening. Removal of the disk is similarly effected by finger pressure against the pedestal, and simultaneous lifting at the perimeter portions.

One class of containers, known as "jewel boxes" have a clear plastic body and a pivotally connected clear plastic lid, an insert member fitting within the body and being formed with the various disk-contacting surfaces and associated members. Another class of containers has the body and lid integrally formed and pivotally joined along opposite edges of a narrow, generally rectangular spine member, with disk-supporting structure integrally formed in the body, such containers referred to as "DVD.boxes" being somewhat oversize as compared with the jewel boxes. These boxes have an important advantage of being less expensive to provide than jewel boxes.

It is also known to provide disk containers with an interior partition for storage and access of a pair of disks. In a typical configuration, such containers include a partition portion having disk retainers on opposite sides and a pair of transparent lids that are pivotally connected at respective opposite sides along opposite end edges of the partition portion. Unfortunately, the dual-disk storage boxes of the prior art are excessively expensive to provide in that they are significantly more complex and tooling costs must be amortized over much smaller quantities of production. There are also containers for three disks, wherein one disk is supported in a fixed position relative to the container body, and a pair of disks are supported on opposite sides of a hinged tray. One such example is configured as a DVD box, with the tray having a hinged connection to the spine member. A particular disadvantage of this arrangement is that the tray slides laterally relative to the body as the lid is opened because the spine member pivots relative to the body as the lid is opened. This sliding movement is objectionable in that damage to one or more disks can occur by scratching. A further objection is that the sliding movement produces vibration and jarring which has a tendency to dislodge disks out of engagement with supporting structure, with a consequent likelihood of being dropped as the container is opened. Compounding this problem is the fact that the one-piece DVD box configuration typically has snap-together structure for holding such boxes closed, and opening of those cases is somewhat difficult because there is little room for finger depressions that are gripped during opening of the boxes, particularly in view of extra space required inside the boxes for clearing the trays, the DVD box configuration having somewhat restrictive standard outside dimensions. The shallow finger depressions of the prior art are also an impediment to automated loading of disks into the containers in that they are particularly difficult to grip for opening by machines.

Another problem associated with multiple disk storage containers is that separate tooling and parts inventory are required for containers holding each number of disks, and a container for a particular number of disks cannot ordinarily be converted for holding a greater number of disks.

Thus there is a need for a protective disk container that has an integrally formed enclosure, that can be inexpensively converted for multiple disk storage, and that otherwise overcomes the disadvantages of the prior art.

SUMMARY

The present invention meets this need by providing a molded disk container that accommodates multiple disk trays without subjecting the trays or disks held in the container to sliding contact during opening and closing of the container. In one aspect of the invention, a disk container includes a case having base, lid, and spine portions, the base portion including a base panel portion, a forwardly projecting base pedestal for retaining a first disk, and a hinge structure connected to the base portion for engaging and pivotably supporting a tray holding a second disk, the hinge structure projecting forwardly from the base portion and hinged connections of the base and lid portions to the spine portion being spaced sufficiently to allow the closed condition of the case with the first disk being retained on the base pedestal and the tray engaging the hinge structure while holding the second disk. The container can be in combination with the tray, the tray including a tray panel portion and a tray pedestal projecting from a first side thereof for retaining the second disk. Preferably the tray has a first spacer structure on the first side of the tray panel portion for preventing contact between the case and the second disk when the case is in the closed condition and the tray is engaging the hinge structure. The tray pedestal can be double sided for supporting a third disk on a second side of the tray panel portion, a second spacer structure on the second side of the tray panel portion preventing contact between the case and the third disk when the case is in the closed condition thereof. Preferably the case has a shroud formation for preventing contact between the tray and the first disk.

Preferably the hinge structure is configured for receiving plural counterparts of the tray. Also, the container can be in combination with at least two of the trays. The container can be assembled with three of the trays pivotally engaging the hinge structure.

The base portion of the case can include a shroud formation for protecting an edge portion of the disk, with a pair of finger depressions formed therein on opposite sides of the pedestal for permitting the disk to be gripped by a user's fingers when the disk is engaging the pedestal.

The lid portion of the case can include a lid panel portion, with side wall portions of the case in combination with the spine portion forming an enclosure in a releasably held closed condition of the case, a side wall portion opposite the spine portion being inwardly displaced from perimeter extremities of the base and lid panel portions in the closed condition to form respective lips in the base and lid portions for facilitating opening of the case, the lips being hook-shaped in cross-section and projecting toward each other for further facilitating opening of the case. The side wall portions can be formed on each of the base and lid portions, respective lip extremities of the side wall portions being in overlapping relation in the closed condition of the case. The respective portions of the lip extremities are preferably formed on corresponding inwardly displaced side wall portions opposite the spine portion, with mating registration tabs on the side wall portions within the inwardly displaced side wall portions.

DRAWINGS

These and other features, aspects, and advantages of the present invention will become better understood with reference to the following description, appended claims, and accompanying drawings, where:

FIG. 1 is a perspective sectional view of a protective disk case according to the present invention, the case being in an open condition;

FIG. 1A is a perspective detail view within region A of FIG. 1;

FIG. 1B is a perspective detail view within region B of FIG. 1;

FIG. 1C is a perspective detail view within region C of FIG. 1;

FIG. 2 is a perspective view of a protective disk container including the case of FIG. 1, assembled with a hinged disk-supporting tray;

FIG. 3 is a detail view of a hinge portion of the tray of FIG. 2;

DESCRIPTION

Figure 4:
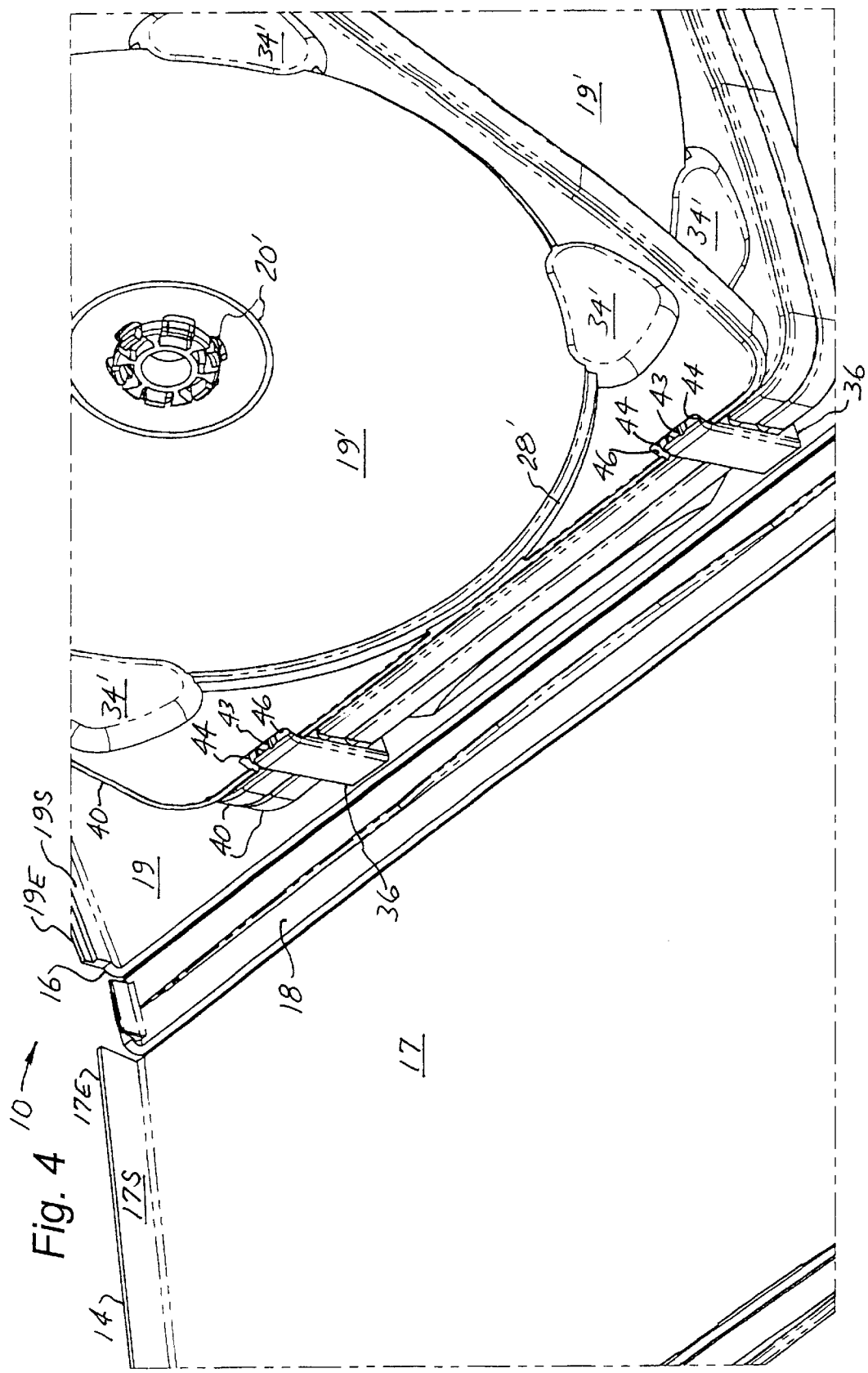
FIG. 4 is a partial perspective view of the container of FIG. 2, including three of the trays.

The present invention is directed to a disk container that is particularly effective and configurable for protectively storing different numbers of disks such as CDS and DVDs. With reference to FIGS. 1, 1A, 1B, 1C, 2, and 3 of the drawings, a DVD box 10 includes a case 12 that may have a transparent jacket (not shown) bonded thereto in a conventional manner for displaying printed material, the case having a base portion 14 a lid portion 16, and a spine portion 18 that movably connects the base and lid portions. In an exemplary configuration, the case 12 is an integrally formed molded member, so-called "living hinges" being formed along opposite edges of the spine portion 18. The base and lid portions 14 and 16 include respective lid panel and base panel portions 17 and 19, and respective perimeter side portions 17S and 19S that snap together in edgewise adjacency in a closed condition of the box 10, the spine portion 18 and the side portions 17S and 19S together forming four side walls of the case 12, the lid panel portion 17 forming a front wall, the base panel portion 19 forming a rear wall. Mating pairs of holder structures provide the snap together engagement of the case, the holder structures of the lid portion 16 being designated 17H and those of the base portion 14 being designated 19H. In further description of the case 12, the terms "front" and "forward" with respect to the base refer to a direction toward the lid portion 16 in the closed condition of the box 10; conversely, "rear", "rearward", and "back" refer to a direction away from the lid portion.

A pedestal 20 of the case 12 projects forwardly from the panel portion 19 of the base 14 for supportively engaging a compact disk (CD) or digital video disk (DVD) 22 having front and rear surfaces, a central opening 25, and a periphery 26, the pedestal engaging the central opening 25. A shroud formation 28 of case 12 also projects forwardly on the panel portion 19 in generally concentric relation to the pedestal 20 proximate the periphery 26 of a disk being supported on the pedestal 20, the shroud formation 28 projecting forwardly of the disk 22 for blocking inadvertent contact with the disk. The shroud formation 28 has at least one pair of finger depressions 34 for permitting opposite perimeter portions of the disk 22 to be grasped by a user of the container 10.

According to the present invention, the base portion 14 is formed with a hinge structure projecting forwardly therefrom, and exemplary and preferred configuration thereof being a spaced pair of hinge posts 36 being equally spaced slightly away from the spine portion 18, each hinge post having a facing parallel-spaced pair of forwardly extending leaf members 38 for pivotally locating a tray 40 of the container 10 within the case 12 as shown in FIG. 2 and further described herein. The hinge posts 36 are oriented with the leaf members 38 thereof in alignment parallel-to the spine 18 and having inwardly projecting tip extremities 42 that are connected by a reinforcing bridge bar 43. The leaf members 38 of each hinge post 36, including the tip extremities 42, extend laterally on opposite sides of the bridge bar 43 for snap engagement with an inwardly facing pair of stub journals 44 that are formed on a pivot axis 45 of the tray 40. As further shown in FIG. 2, the tray 40 has a pair of inwardly extending notches 46 that are spaced apart for receiving respective ones of the hinge posts 36, the stub journals 44 extending within the notches 46 from opposite sides thereof best shown in FIG. 3. Further, each pair of stub journals 44 is spaced apart by a distance somewhat greater than a lateral thickness of the bridge bars 43, so that the tip extremities 42 can flex to receive the stub journals 44. It will be understood that each of the notches 46 need have only one of a single pair of oppositely projecting stub journals 44, in which case the bridge bars 43 would normally be offset from the centers of the hinge posts 36 away from the stub journals. Also, the tip extremity 42 of only one leaf member 38 of each hinge post 36 is required to project toward the other leaf member in order to provide the above-described snap engagement.

The tray 40 is formed having a tray panel portion 19', a pedestal 20', and a shroud formation 28' having finger depressions 34'. Further, the exemplary configuration of the tray 40 has a forwardly and rearwardly projecting rim 48 that defines a perimeter of the tray, the rim also reinforcing the tray 40. The shroud formation 28' and/or the rim 48 serving to prevent contact between the lid portion 16 of the case 12. It will be understood that the tray 40 can be configured for assembly in an inverted orientation wherein a disk 22 mounted thereon faces toward the base portion 16 in the closed condition of the container 12. Also, the container 10 can be initially provided without the tray 14, which can be added whenever it is desired to accommodate more than one of the disks 22. It will be further understood that the tray 40 can be configured to hold a pair of the disks 22 on opposite sides of the tray, as shown and described below in connection with FIGS. 5 and 6. Typically, the disk container 10 of the present invention is configured for conventional disks having an outside diameter of 120 mm, an inside diameter of 15 mm, and a thickness of between 1.2 mm and 1.3 mm. A suitable material for both the case 12 and the tray 40 of the disk container 10 is polypropylene plastic.

With further reference to FIG. 4, the container 10 of the present invention has the case 12 preferably configured for receiving a plurality of the trays 40, three of the trays 40 being pivotally supported by the hinge posts 36. Advantageously, opening and closing of the case 12 does not produce sliding contact between the trays 40 and the case 12. Thus the disks are not subjected to vibrations and jarring that might otherwise occur during opening of the case 12 due to such sliding contact; consequently, the present invention provides enhanced protection against disks being inadvertently dropped when the case is opened. It will be appreciated that rearward movement of the trays 40 toward the base panel portion 19 can be blocked by appropriately forming the hinge posts 36 to extend behind the stub journals 44 of the rearmost one of the trays 40 for contacting those stub journals at a predetermined location of the corresponding pivot axis 45 relative to the base portion 14. Of course, the container 10 can be furnished initially with fewer than a full complement of the trays 40.

As described above, the lid and base side portions 17S and 19S of the case 12 releasably lock together to form three side walls (the spine portion 18 forming a fourth side wall) of the case 12 in a closed condition thereof, the closed condition being indicated by the curved arrow in FIG. 1. Also, the side portions 17S and 19S are formed for overlapping engagement in that an inwardly displaced lip extremity 17E of the lid side portion 17S faces an outwardly displaced lip extremity of the base side portion 19S as indicated by the point of the curved arrow in FIG. 1, the oppositely offset configurations of the lip extremities 17E and 19E being best shown in FIGS. 1A and 1B. Additionally, the side portions 17S and 19S are each displaced inwardly along a portion of an outside perimeter of the case 12 opposite the spine portion 18 as indicated at 17D and 19D, respective overhanging lips 17L and 19L being formed for facilitating opening of the case 12. Further, the lips 17L and 19L are each hook-shaped in cross-section, projecting inwardly toward each other in the closed condition of the case 12 as best shown in FIGS. 1A and 1B for being effectively gripped by fingers of a person opening the case notwithstanding a particularly shallow configuration of the inwardly displaced portions 17D and 19D of the lid and base side portions 17S and 19D. The inwardly projecting extremities of the overhanging lips 17L and 19L are further advantageous in that they create respective outwardly extending cavities to be engaged by mechanical elements between the lips 17L and 19L and the inwardly displaced side portions 17D and 19D to facilitate automated opening of the case 12 for loading of the disks 12 by machines. As further shown in FIGS. 1A and 1B, the inwardly displaced side portions 17D and 19D have respective interlocking tab formations 17T and 19T.

Figure 5:
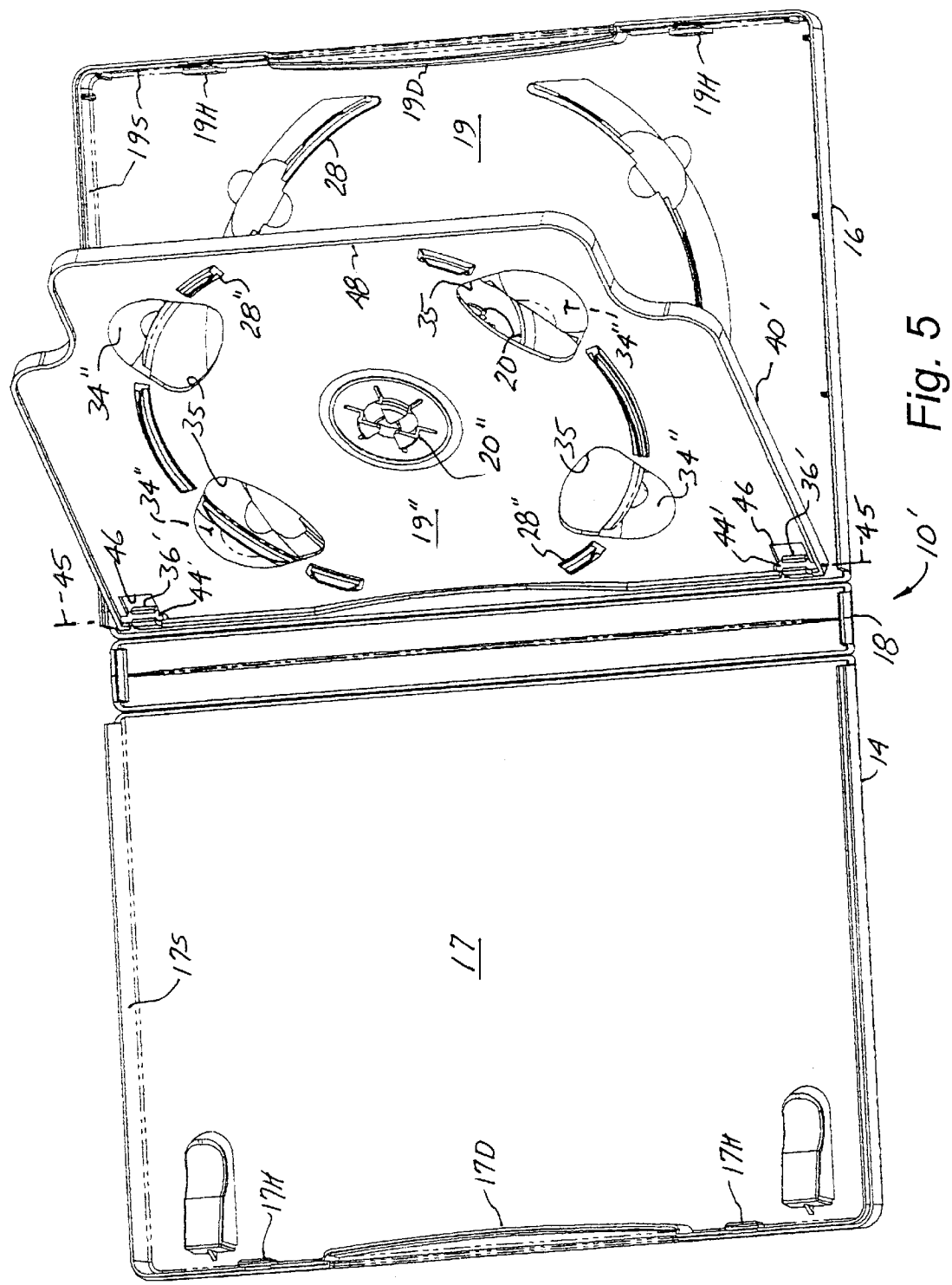
FIG. 5 is a perspective view as in FIG. 2, showing an alternative configuration of the disk container.
Figure 6:
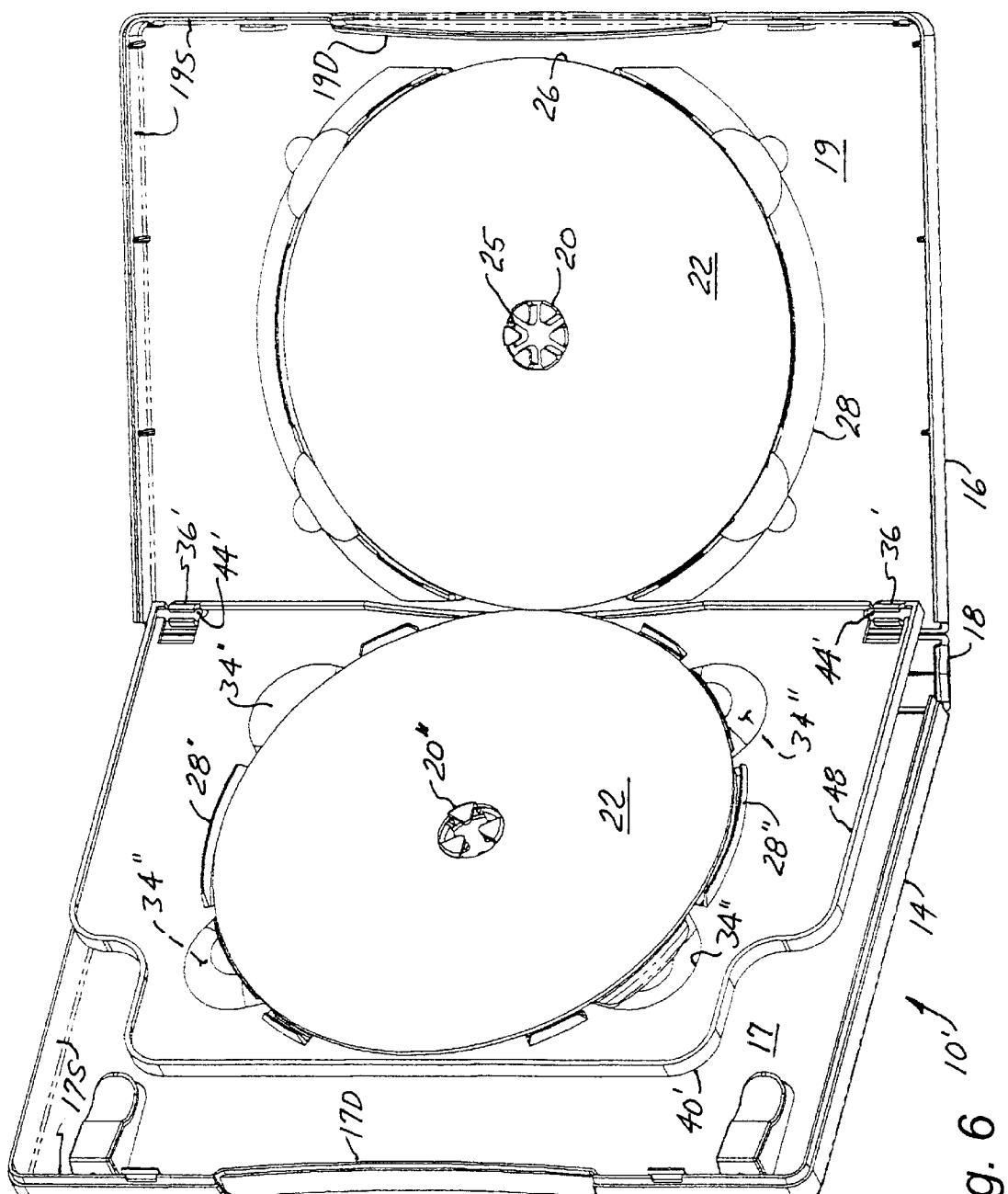
FIG. 6 is a perspective view as in FIG. 4, showing the tray pivoted to show an opposite side thereof, with disks being carried by the case and the tray.

With further reference to FIGS. 5 and 6, an alternative configuration of the disk container, designated 10', has the case 12 with counterparts of the hinge posts, designated 36', formed without the bridge bar reinforcements 44 of the configuration of FIGS. 1–4 for supporting one or more counterparts of the trays, designated 40'. In this configuration, integrally formed counterparts of the stub journals, designated 44', extend fully across each of the notches 46 of the trays 40'. Also, the hinge posts 36' have increased spacing the trays 40' also being relatively wider in a direction parallel to the tray pivot axis 45 than the trays 40 of FIGS. 2 and 3.

The tray 40' has a double-sided counterpart of the pedestal, designated 20", for supporting disks 22 on opposite sides of a panel portion 19", counterparts of the shroud formation, designated 28", being provided on opposite sides of the panel portion 19". Also, oppositely facing pairs of finger depressions, designated 34" are formed in the tray 40', an opening 35 being associated with each of the finger depressions 34". FIG. 6 shows the container 10' with a disk being directly supported in the base portion 16, and another disk 22 being supported on the side of the tray 40' that faces the base portion 16 on the closed condition of the case 12.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. A container for disks of the type having a central opening, front and back face surfaces, and an outer perimeter, the container comprising:
    (a) a case comprising a base portion, a lid portion and a generally rectangular spine portion, the base portion and the lid portion being hingedly connected along opposite side extremities of the spine portion, the case having an open condition wherein the base, spine, and lid portions are generally coplanar, and a closed condition wherein the lid portion is in facing relation with a front side of the base portion, the base portion including a base panel portion that forms a rear wall of the case;
    (b) a base pedestal projecting forwardly from the base panel portion for retaining a first disk being one of the disks by engagement with the central opening thereof; and
    (c) a hinge structure rigidly connected relative to the base panel portion for engaging and pivotably supporting a tray for holding a second disk being another of the disks, the hinge structure projecting forwardly from the base portion and the hinged connections of the base and lid portions to the spine portion being spaced sufficiently to allow the closed condition of the case with the first disk being retained on the base pedestal and the tray engaging the hinge structure while holding the second disk.

2. The container of claim 1, in combination with the tray, the tray comprising a tray panel portion and a tray pedestal projecting from a first side of the tray panel portion for retaining the second disk by engagement with the central opening thereof.

3. The container of claim 2, wherein the tray further comprises a first spacer structure projecting from the first side of the tray panel portion sufficiently for preventing contact between the case and the second disk when the case is in the closed condition and the tray is engaging the hinge structure.

4. The container of claim 2, wherein the tray pedestal is double sided for supporting a third disk on a second side of the tray panel portion, the tray further comprising a second spacer structure on the second side of the tray panel portion for preventing contact between the case and the third disk when the case is in the closed condition thereof.

5. The container of claim 2, wherein the case further comprises a shroud formation for preventing contact between the tray and the first disk.

6. The container of claim 1, wherein the hinge structure is configured for receiving plural counterparts of the tray.

7. The container of claim 6, in combination with at least two of the trays.

8. The container of claim 6, comprising three of the trays being pivotally supported by the hinge structure.

9. The container of claim 1, wherein the base portion further comprises a shroud formation for protecting an edge portion of the disk, the shroud formation having a pair of finger depressions formed therein on opposite sides of the pedestal for permitting the disk to be gripped by a user's fingers when the disk is engaging the pedestal.

10. A container for disks of the type having a central opening, front and back face surfaces, and an outer perimeter, the container comprising:

(a) a case comprising a base portion, a lid portion, and a generally rectangular spine portion, the base portion and the lid portion being hingedly connected along opposite side extremities of the spine portion, the case having an open condition wherein the base, spine, and lid portions are generally coplanar, and a closed condition wherein the lid portion is in facing relation with a front side of the base portion, the base portion including a base panel portion;

(b) a base pedestal projecting forwardly from the base panel portion for retaining a first disk being one of the disks by engagement with the central opening thereof; and (c) a hinge structure connected to the base portion for engaging and pivotably supporting a tray for holding a second disk being another of the disks, the hinge structure projecting forwardly from the base portion and the hinged connections of the base and lid portions to the spine portion being spaced sufficiently to allow the closed condition of the case with the first disk being retained on the base pedestal and the tray engaging the hinge structure while holding the second disk, wherein the lid portion of the case has a lid panel, the case further comprising side wall portions and means for holding the case in the closed condition, the side wall portions in combination with the spine portion forming an enclosure, a side wall portion opposite the spine portion being inwardly displaced from perimeter extremities of the base and lid panel portions in the closed condition of the case, respective lips being formed in the base and lid portions for facilitating opening of the case, and wherein the lips are hook-shaped in cross-section, extremities thereof projecting toward each other for further facilitating opening of the case.

11. The container of claim 10, wherein the side wall portions are formed on each of the base and lid portions, respective lip extremities of the side wall portions being in overlapping relation in the closed condition of the case.

12. The container of claim 11, wherein the respective portions of the lip extremities are formed on corresponding inwardly displaced side wall portions opposite the spine portion, mating registration tabs being formed on the side wall portions within the inwardly displaced side wall portions.

13. A container for a disk having a central opening, front and back face surfaces, and an outer perimeter, the container comprising:

(a) a case comprising a base portion, a lid portion, and a generally rectangular spine portion, the base portion and the lid portion being hingedly connected along opposite side extremities of the spine portion, the case having an open condition wherein the base, spine, and lid portions are generally coplanar, and a closed condition wherein the lid portion is in facing relation with a front side of the base portion, the base portion including a base panel portion;

(b) a base pedestal projecting forwardly from the base panel portion for retaining a first disk being one of the disks by engagement with the central opening thereof;

(c) a hinge structure including a spaced pair of hinge posts connected to the base portion, each hinge post comprising a parallel-spaced pair of leaf members, at least one of the leaf members having a tip extremity projecting toward the other leaf extremity, and a bridge rod connecting the leaf members proximate the tip extremity; and (d) a tray being pivotally supported by the hinge portion and comprising:

(i) a tray panel portion;

(ii) a pair of stub journals projecting oppositely from the tray panel portion on a tray pivot axis, the stub journals having snap engagement passing the tip extremities of respective hinge posts into respective locations between the leaf members thereof;

(iii) a tray pedestal projecting from a first side of the tray panel portion for holding a second disk being another of the disks by engagement with the central opening thereof; and (iv) a first spacer structure projecting from the first side of the tray panel portion; and (e) a shroud formation for preventing contact between the tray and the first disk, the hinge structure projecting forwardly from the base portion and the hinged connections of the base and lid portions to the spine portion being spaced sufficiently to allow the closed condition of the case with the first disk being retained on the base pedestal and the tray holding the second disk, the first spacer structure projecting sufficiently for preventing contact between the case and the second disk when the case is in the closed condition and the tray is engaging the hinge structure.

14. The container of claim 13, wherein the tray pedestal is double sided for supporting a third disk on a second side of the tray panel portion, the tray further comprising a second spacer structure on the second side of the tray panel portion for preventing contact between the case and the third disk when the case is in the closed condition thereof.

15. The container of claim 13, wherein the hinge structure is configured for receiving plural counterparts of the tray.

* * * * *